Feb. 6, 1923.

C. H. BERRY.
ABSOLUTE PRESSURE GAUGE.
ORIGINAL FILED MAY 12, 1920.

1,444,099.

Inventor
C. Harold Berry,
By Shepherd & Cowskell
Attorneys

Patented Feb. 6, 1923.

1,444,099

UNITED STATES PATENT OFFICE.

CHARLES HAROLD BERRY, OF DETROIT, MICHIGAN.

ABSOLUTE PRESSURE GAUGE.

Original application filed May 12, 1920, Serial No. 380,880. Patent No. 1,376,505. Divided and this application filed December 10, 1920. Serial No. 429,735.

*To all whom it may concern:*

Be it known that I, CHARLES HAROLD BERRY, a citizen of the United States, residing at 368 Clarendon Avenue, Detroit, in the county of Wayne and State of Michigan, have invented certain new and useful Improvements in Absolute Pressure Gauges, of which the following is a specification, reference being had therein to the accompanying drawings.

The object of the present invention is to provide a gauge constructed in such manner that the true pressure may be ascertained therefrom without computations, irrespective of variations in atmospheric pressure.

The present invention contemplates the provision of a gauge having a dial graduated in terms of absolute pressure, a pressure indicating pointer movable with respect to said dial and connections to shift the pointer with respect to the dial in such manner as to compensate for variations in atmospheric pressure.

This application is a division of my co-pending application Serial Number 380,880, filed May 12, 1920 which resulted in grant of U. S. Patent No. 1,376,505, and its claims are directed to the manual actuation of the compensating mechanism in contradistinction to the automatic actuation thereof under the influence of a barometer, which latter now constitutes the subject matter of application 380,880.

In the accompanying drawing in which like reference characters designate corresponding parts:

Figure 1:
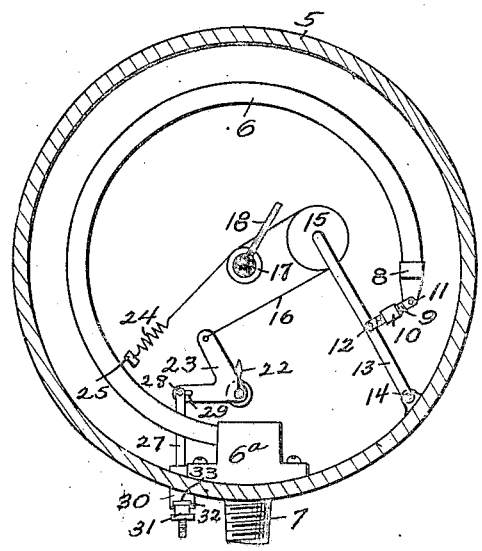
Figure 1 is a view of a gauge constructed in accordance with the invention with the case of the gauge shown in section and with the pointer controlling mechanism in elevation.
Figure 2:
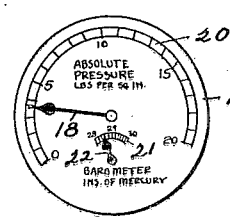
Fig. 2 is a reduced face view of the dial of the gauge.

In the drawing 5 designates the case of the gauge. This case houses a pressure actuated element such as a Bourdon tube 6. This tube receives pressure through a block 6ª that is provided with a threaded connection 7 of a usual and known character. The extremity of the Bourdon tube 5 carries a head 8. A link 9 which includes turnbuckle 10 in its length is pivotally connected to the head 8 at 11 and is pivotally connected at 12 to a swinging lever 13. The lever 13 is pivoted at 14 to the case of the gauge and carries a guiding element in the form of a drum or roller 15 at its other end. A wire or cable 16 passes over the drum 15 and over a drum 17 that is fast upon the shaft of the pressure actuated pointer 18 of the gauge. This pointer moves over the face of the dial 19 in the usual and well known way and coacts with a pressure scale 20 formed thereon. This pressure scale is so related to the pointer that its zero point corresponds to absolute pressure or to a true vacuum rather than to atmospheric pressure as is ordinarily the case. The dial 19 also carries a barometric scale 21 with which a pointer 22 coacts. The pointer 22 is mounted concentric to the pivot point of a bell crank lever 23 to which one end of the cable 16 is connected. The opposite end of the cable is connected to a spring 24, said spring in turn being connected to a fixed element 25 carried by the case. The cable 16 may be given one or more turns around the drum 17 and it is manifest that with the bell crank 23 held in a fixed position a given expansive movement of the Bourdon tube will result in moving the pointer 18 to a definite and predetermined degree. It will also be seen that the degree of movement of the pointer 18 may be varied by movement of the bell crank 23 to draw upon or slacken the cord or cable 16.

The means for effecting the setting of the bell crank 23 comprises a rod 27 carrying a pin 28 operable in a slot 29 formed in one arm of the bell crank lever 23. The rod 27 is freely movable longitudinally through a block 30 of the case 5. A thumb nut 31 is threaded upon the rod 27 and has a collar 32 which is engaged with a recessed part 33 of the block 30, whereby said thumb nut is held against endwise rotation. However it may be rotated with respect to the rod 27 and thus impart an endwise movement to said rod to shift the bell crank 23 upon its pivot.

The pointer 22 indicates upon the scale 21 when the movement of the bell crank 23 has been such as to effect the proper compensation in the reading of the pointer 18 upon the scale 20 for the, then existing, atmospheric pressure as determined by the reading of a separate barometer.

In order that the reason for providing the compensatory action set forth may be fully appreciated, it is pointed out that practically all of the gauges in use at the present time are constructed in such manner as to indicate pressures above and below atmospheric pressure, as datum. In other words, the zero points of the said gauges correspond to atmospheric pressure instead of corresponding to a complete vacuum. However, since the atmospheric pressure constantly varies, it is manifest that such gauges cannot accurately represent the true absolute pressure existing in the space to which the gauge is connected, because it has no connection with the atmosphere, and the pressure therein prevailing does not vary with the atmospheric pressure. Under present conditions, if it is desired to determine an accurate value of the absolute pressure from an ordinary type of gauge, it is necessary to read both the gauge and the barometer, whose readings must be reduced to the same units, if they are not already in the same units, and added together, if the pressure measured is above atmospheric pressure. In measuring a pressure that is less than atmospheric, the vacuum gauge is read, the barometer is read and the reading of the vacuum gauge is subtracted from the barometer reading.

It is manifest that the dials may be graduated in many different ways in accordance with the work that the gauge is called upon to do. The pressures may be indicated in any units whatever, English, metric or any other, and in correspondence with the pressure scales, there may be scales of the temperature of vaporization of any substance or scales of any other quantity which varies with and depends upon the temperature, such, for example, as scales of the density of saturated vapor, of total heat or the like.

It is to be understood that the invention is not limited to the precise construction set forth but that it includes within its purview whatever changes fairly come within either the terms or the spirit of the appended claims.

Having described my invention, what I claim is:

1. A gauge comprising a casing, a dial having a scale thereon, a pointer operable thereover, a pressure actuated member, a swinging lever, a link connecting said swinging lever with the pressure actuated member, a guiding element carried by said swinging lever, a flexible element passing over said guiding element, a drum upon the pointer over which said element passes, a spring to one end of which the flexible element is connected the other end of the spring being attached to the casing, a movable member to which the other end of the flexible element is connected, manually operable means for effecting movement of the movable element in accordance with variations in atmospheric pressure and means controlled by said manually operable means for indicating when the movement of the movable element has been such as to compensate for variations in atmospheric pressure.

2. A structure as recited in claim 1 wherein such indicating means consists of a pointer carried by the movable member and a barometric scale upon the dial with which said pointer cooperates, said barometric scale being in such relation to the first named scale as to correct the readings of the pointer on said first named scale when said pointer is shifted under the guidance of said barometric scale in accordance with the then existing atmospheric pressure.

3. A structure as recited in claim 1 wherein the movable member consists of a pivoted bell crank lever, and the indicating means comprises a pointer mounted coaxially with the pivot point of said lever and a barometric scale upon the dial over which said pointer moves.

4. A structure as recited in claim 1 wherein the manually operable means for effecting movement of the movable member comprises a pivoted bell crank lever, a threaded rod engaging one arm of said lever, a thumb nut upon said rod and means for holding said nut against endwise movement while permitting it to rotate.

5. A gauge comprising a case, a dial having a scale thereon, a pointer operable thereover, a pressure operated member, a cable, a spring attached at one end to the case and at its other end to one end of said cable, a drum upon the pointer over which said cable passes, means movable with the pressure actuated member over which the cable passes, for exerting a drawing action upon said cable as the pressure actuated member expands, a manually operable settable element to which the other end of said cable is attached, a pointer upon said settable element and a barometric scale upon the dial with which said pointer coacts, said barometric scale being in such relation to the first named scale as to correct the readings of the first named pointer on said first named scale when the last named pointer is shifted under the guidance of said barometric scale in accordance with the then existing atmospheric pressure.

In testimony whereof I hereunto affix my signature.

C. HAROLD BERRY.